(12) United States Patent
Xu et al.

(10) Patent No.: US 11,624,240 B2
(45) Date of Patent: Apr. 11, 2023

(54) FLUIDIC PULSE ACTIVATED AGITATOR

(71) Applicant: SAUDI ARABIAN OIL COMPANY, Dhahran (SA)

(72) Inventors: Jianhui Xu, Dhahran (SA); Guodong Zhan, Dhahran (SA); Abdulwahab S. Aljohar, Dhahran (SA)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 270 days.

(21) Appl. No.: 17/002,493

(22) Filed: Aug. 25, 2020

(65) Prior Publication Data

US 2022/0065063 A1   Mar. 3, 2022

(51) Int. Cl.

| | |
|---|---|
| *E21B 7/24* | (2006.01) |
| *B33Y 10/00* | (2015.01) |
| *B33Y 50/02* | (2015.01) |
| *B33Y 80/00* | (2015.01) |
| *B28B 1/00* | (2006.01) |
| *E21B 31/00* | (2006.01) |
| *E21B 28/00* | (2006.01) |
| *B23K 26/342* | (2014.01) |
| *B29C 64/165* | (2017.01) |
| *B22F 10/00* | (2021.01) |
| *B23K 15/00* | (2006.01) |

(52) U.S. Cl.
CPC ............... *E21B 7/24* (2013.01); *B28B 1/001* (2013.01); *B33Y 10/00* (2014.12); *B33Y 50/02* (2014.12); *B33Y 80/00* (2014.12); *E21B 28/00* (2013.01); *E21B 31/005* (2013.01); *B22F 10/00* (2021.01); *B23K 15/0086* (2013.01); *B23K 26/342* (2015.10); *B29C 64/165* (2017.08)

(58) Field of Classification Search
CPC .................................. E21B 7/24; E21B 28/00
See application file for complete search history.

(56) References Cited

U.S. PATENT DOCUMENTS

| | | |
|---|---|---|
| 3,396,619 A | 8/1968 | Bowles et al. |
| RE27,087 E | 3/1971 | Binder |
| 5,213,269 A | 5/1993 | Srinath et al. |

(Continued)

FOREIGN PATENT DOCUMENTS

| | | |
|---|---|---|
| CN | 207583316 U | 7/2018 |
| CN | 108442883 A | 8/2018 |

(Continued)

OTHER PUBLICATIONS

International Search Report and Written Opinion of the International Searching Authority issued in corresponding International Application No. PCT/US2020/050977, dated Apr. 28, 2021 (13 pages).

(Continued)

*Primary Examiner* — Jonathan Malikasim
(74) *Attorney, Agent, or Firm* — Osha Bergman Watanabe & Burton LLP

(57) ABSTRACT

A fluidic agitator includes a seamless insert body having an outer enclosure wall defining an enclosed cavity and a plurality of inner channel walls arranged to define an inlet chamber, a vortex chamber, and a feedback chamber within the enclosed cavity. The inlet chamber, the vortex chamber, and the feedback chamber create a hydraulic pulse in a fluid stream received in the enclosed cavity.

13 Claims, 13 Drawing Sheets

(56) References Cited

U.S. PATENT DOCUMENTS

| | | | |
|---|---|---|---|
| 8,931,566 | B2 | 1/2015 | Dykstra et al. |
| 8,944,160 | B2 | 2/2015 | Surjaatmadja et al. |
| 9,212,522 | B2 | 12/2015 | Schultz et al. |
| 9,260,952 | B2 | 2/2016 | Fripp et al. |
| 9,316,065 | B1 | 4/2016 | Schultz et al. |
| 9,546,536 | B2 | 1/2017 | Schultz et al. |
| 9,598,923 | B2 | 3/2017 | Gilleylen et al. |
| 10,450,819 | B2 | 10/2019 | Zhang et al. |
| 10,502,014 | B2 * | 12/2019 | Kletzel ............... E21B 28/00 |
| 10,830,020 | B2 * | 11/2020 | Xu ..................... E21B 28/00 |
| 2009/0178801 | A1 * | 7/2009 | Nguyen .............. E21B 28/00 166/249 |
| 2012/0168013 | A1 * | 7/2012 | Schultz ............... E21B 28/00 29/890.14 |
| 2012/0168015 | A1 | 7/2012 | Schultz et al. |
| 2018/0171719 | A1 | 6/2018 | Donald et al. |
| 2018/0171726 | A1 | 6/2018 | Donald et al. |
| 2020/0048993 | A1 | 2/2020 | Xu et al. |

FOREIGN PATENT DOCUMENTS

| | | |
|---|---|---|
| CN | 109915030 A | 6/2019 |
| CN | 209704487 U | 11/2019 |
| DE | 102013224040 A1 | 5/2015 |
| EP | 0304988 A1 | 3/1989 |
| EP | 2554854 A2 | 2/2013 |

OTHER PUBLICATIONS

Ponnusamy, P. et al., "Mechanical performance of selective laser melted 17-4 PH stainless steel under compressive loading", Solid Freeform Fabrication 2017: Proceedings of the 28th Annual International Solid Freeform Fabrication Symposium—An Additive Manufacturing Conference, pp. 321-331 (11 pages).

Bird, R. Keith and Joshua Hibberd, "Tensile Properties and Microstructure of Inconel 718 Fabricated with Electron Beam Freeform Fabrication (EBF3)", NASA/TM-2009-215929, NASA, Sep. 2009 (19 pages).

* cited by examiner

FLUIDIC PULSE ACTIVATED AGITATOR

BACKGROUND

To produce hydrocarbons from a subsurface reservoir, one or more wellbores that penetrate the subsurface reservoir typically have to be formed. A wellbore is formed by cutting through rock formations in the subsurface using a drill bit at a bottom end of a drill string. While drilling the wellbore, weight on bit, or WOB, is needed for the drill bit to engage with and cut into the rock formation. The WOB is typically created by the weight of the drill string and sometimes by a pushing force from a top drive. When drilling lateral wellbores, at least part of the weight of the drill string will not positively contribute to the WOB. Instead, this part of the weight that does not positively contribute to the WOB will create friction between the drill string and the lateral section of the wellbore or a casing in the lateral section of the wellbore. This unfavorable friction force can become even worse when drilling long horizontal wells.

Agitators that generate vibration along an axial axis of the drill string have been proposed as a solution to minimizing the unfavorable friction force created by the weight of the drill string during drilling. One type of agitator tools includes a power section with a valve. The closing and opening actions of the valve are controlled by the movement of the power section, resulting in pulses that are activated to create an axial cyclic motion. An example of this type of agitator is available from National Oilwell Varco, for example, under the trade names Agitator System and AgitatorHE System. Another type of agitator tools is a fluidic pulse activated system, or simply fluidic agitator, which includes a fluidic flow channel in which an inlet chamber, a vortex chamber, and a feedback chamber work together to create a hydraulic pulse. A fluidic agitator is described, for example, in U.S. Patent Publication No. 20200048993 ("Tool Assembly with a Fluidic Agitator and a Coating", 13 Feb. 2020).

A typical process for manufacturing a fluidic agitator includes forming the delicate fluidic flow channel in a main body by traditional machining processes, such as lathing, turning, and milling. Afterward, at least a cover is seam welded to the main body. The seam weld is therefore exposed to fluid flow in the chambers. Under the flow turbulence required to generate the hydraulic pulse, the chamber surfaces and seam welds are subject to erosion, with the seam welds often forming the weakest points in the system. In one scenario, low-temperature brazing material is used as a filler in the seam weld, which can make the seam weld especially vulnerable to erosion due to the material being typically soft. U.S. Patent Publication No. 20200048993 describes use of a hard coating to protect the inlet and vortex chambers in an insert of a fluidic agitator from surface erosion.

SUMMARY

In a first summary example, a fluidic agitator includes a seamless insert body having an outer enclosure wall defining an enclosed cavity and a plurality of inner channel walls arranged to define an inlet chamber, a vortex chamber, and a feedback chamber within the enclosed cavity. The inlet chamber, the vortex chamber, and the feedback chamber create a hydraulic pulse in a fluid stream received in the enclosed cavity.

The seamless insert body may comprise a metal, a metal alloy, a ceramic, or a composite material. The outer enclosure wall may include an inlet opening and an outlet opening. The inlet chamber may be fluidly connected to the inlet opening, and the vortex chamber may be fluidly connected to the outlet opening. The plurality of inner channel walls may be arranged to define a first fluid path and a second fluid path between the inlet chamber and the vortex chamber. The plurality of inner channel walls may be arranged to define a third fluid path and a fourth fluid path between the feedback chamber and the vortex chamber. The plurality of inner channel walls may be arranged to define a first feedback channel and a second feedback channel extending between the inlet chamber and the feedback chamber and along an inner surface of the outer enclosure wall. The fluidic agitator may include an outlet passage formed in the outer enclosure wall. The outlet passage may be fluidly connected to the vortex chamber and the outlet opening.

The outer enclosure wall may include a body wall section extending between a first end wall section and a second end wall section. The inlet opening may be formed in the first end wall section. The outlet opening may be formed in one of the body wall section and the second end wall section. The fluidic agitator may include a first flange projecting from the first end wall section and a second flange projecting from the second end wall section. Alternatively, the fluidic agitator may include a first threaded connection coupled to the first end wall section and a second threaded connection coupled to the second wall section. An exterior surface of the body wall section may include a first curved surface and a second curved surface. A radius of curvature of the first curved surface may be different from a radius of curvature of the second curved surface.

In a second summary example, a downhole tool includes a pipe having a cutout formed in its wall and a fluidic agitator. The fluidic agitator includes a seamless insert body inserted in the pipe through the cutout. The seamless insert body has an outer enclosure wall defining an enclosed cavity and a plurality of inner channel walls arranged to define an inlet chamber, a vortex chamber, and a feedback chamber within the enclosed cavity. The inlet chamber, the vortex chamber, and the feedback chamber create a hydraulic pulse in a fluid stream passing through the pipe.

The fluidic agitator may include at least one flange that mates with a portion of the wall exposed by the cutout. An exterior surface of the seamless insert body may have at least one shoulder that mates with a portion of the wall exposed by the cutout. The outer enclosure wall may include an inlet opening that is fluidly connected to the inlet chamber and an outlet opening that is fluidly connected to the vortex chamber, where the inlet opening and the outlet opening are open to a bore of the pipe.

In a third summary example, a method of making a fluidic agitator includes generating a 3D computer model of a seamless insert body as described in the first summary example, selecting a metal, a metal alloy, a ceramic, or a composite material, and printing the seamless insert body by an additive process using the 3D computer model and the selected material. The additive process may be one of a direct laser melting process, a direct electron beam melting process, a selective laser sintering process, a direct metal laser sintering process, and a binder jetting process. The method may include sintering the seamless insert body during or after the printing.

The foregoing general description and the following detailed description are exemplary of the invention and are intended to provide an overview or framework for understanding the nature of the invention as it is claimed. The accompanying drawings are included to provide further understanding of the invention and are incorporated in and constitute a part of the specification. The drawings illustrate various embodiments of the invention and together with the description serve to explain the principles and operation of the invention.

BRIEF DESCRIPTION OF DRAWINGS

The following is a description of the figures in the accompanying drawings. In the drawings, identical reference numbers identify similar elements or acts. The sizes and relative positions of elements in the drawings are not necessarily drawn to scale. For example, the shapes of various elements and angles are not necessarily drawn to scale, and some of these elements may be arbitrarily enlarged and positioned to improve drawing legibility. Further, the particular shapes of the elements as drawn are not necessarily intended to convey any information regarding the actual shape of the particular elements and have been solely selected for ease of recognition in the drawing.

DETAILED DESCRIPTION

Figure 1:
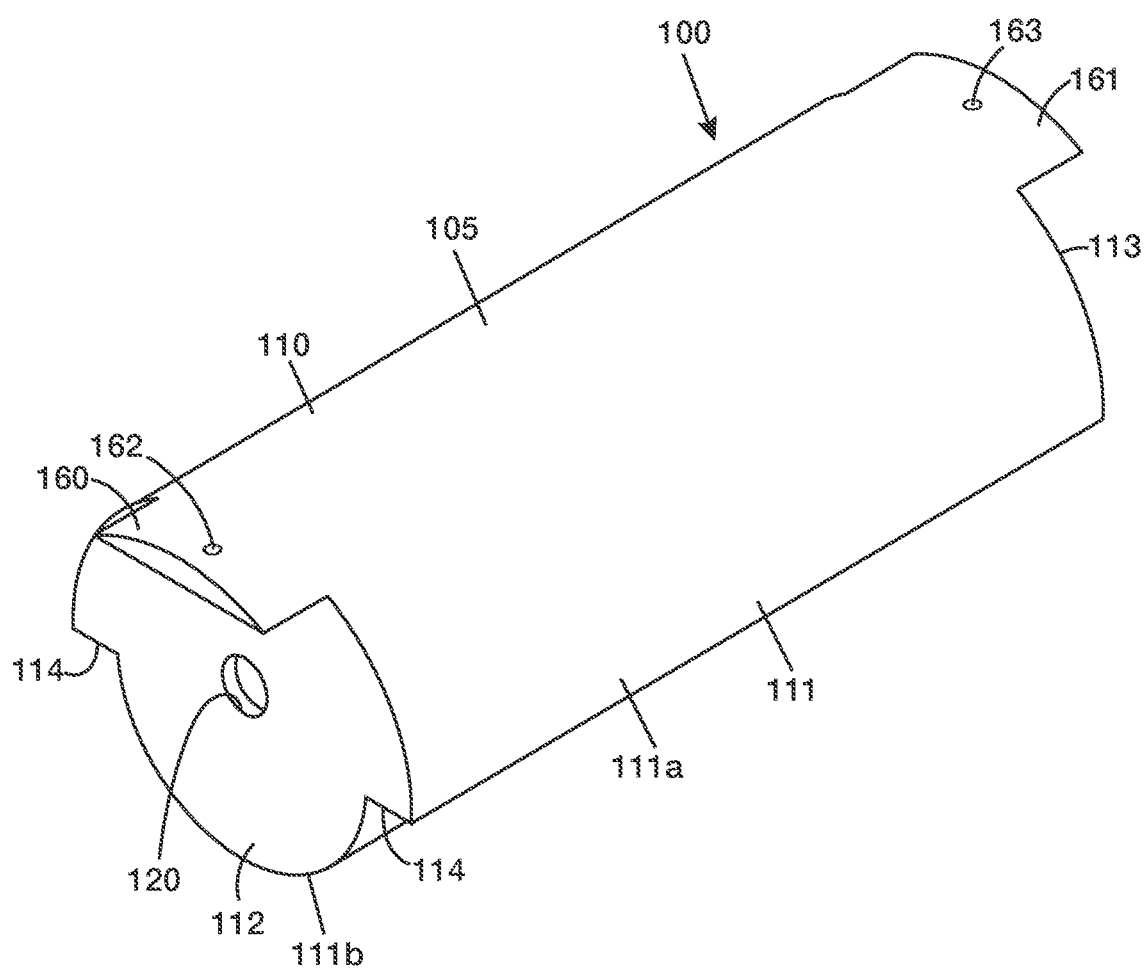
FIG. 1 is a perspective view of a fluidic agitator.

In the following detailed description, certain specific details are set forth in order to provide a thorough understanding of various disclosed implementations and embodiments. However, one skilled in the relevant art will recognize that implementations and embodiments may be practiced without one or more of these specific details, or with other methods, components, materials, and so forth. In other instances, related well known features or processes have not been shown or described in detail to avoid unnecessarily obscuring the implementations and embodiments. For the sake of continuity, and in the interest of conciseness, same or similar reference characters may be used for same or similar objects in multiple figures.

Figure 2:
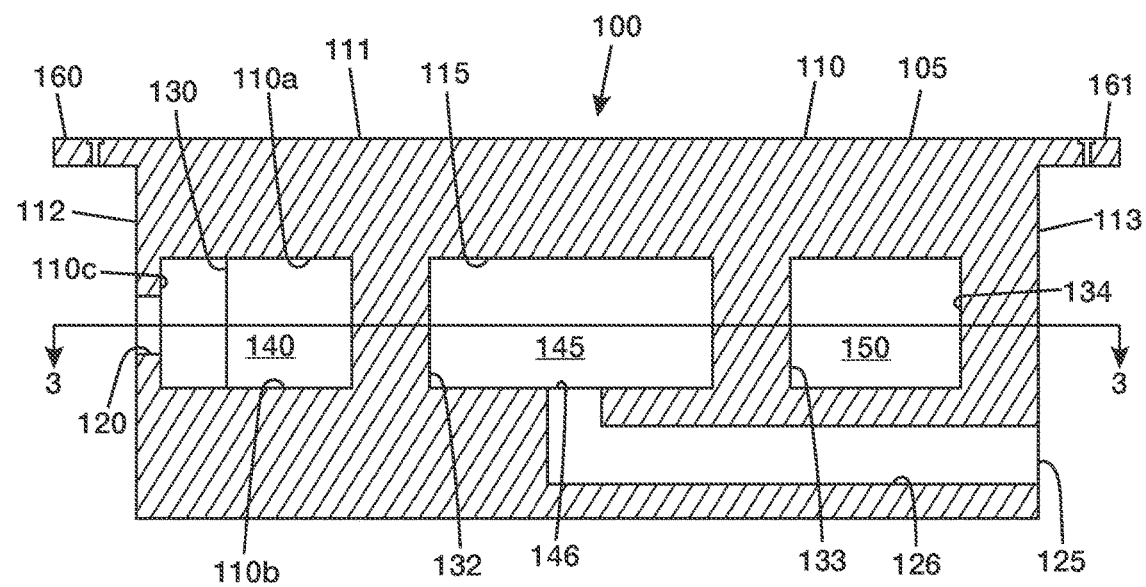
FIG. 2 is a cross-section of the fluidic agitator of FIG. 1.
Figure 3:
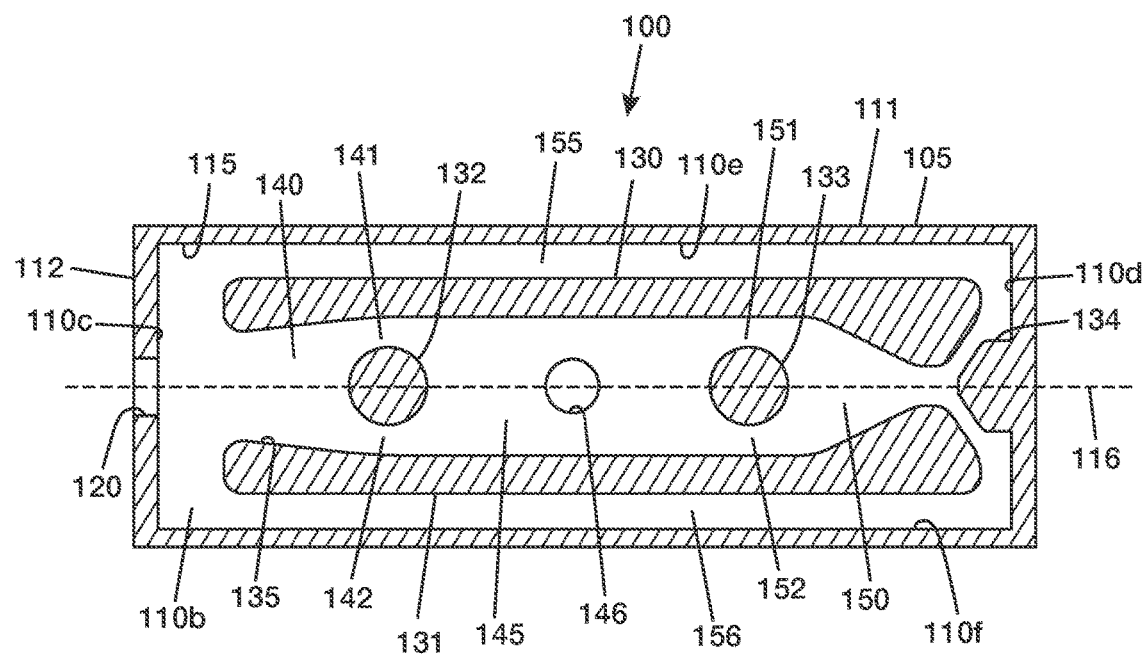
FIG. 3 is a cross-section of the fluidic agitator of FIG. 1 along line 3-3 of FIG. 3.
Figure 4:
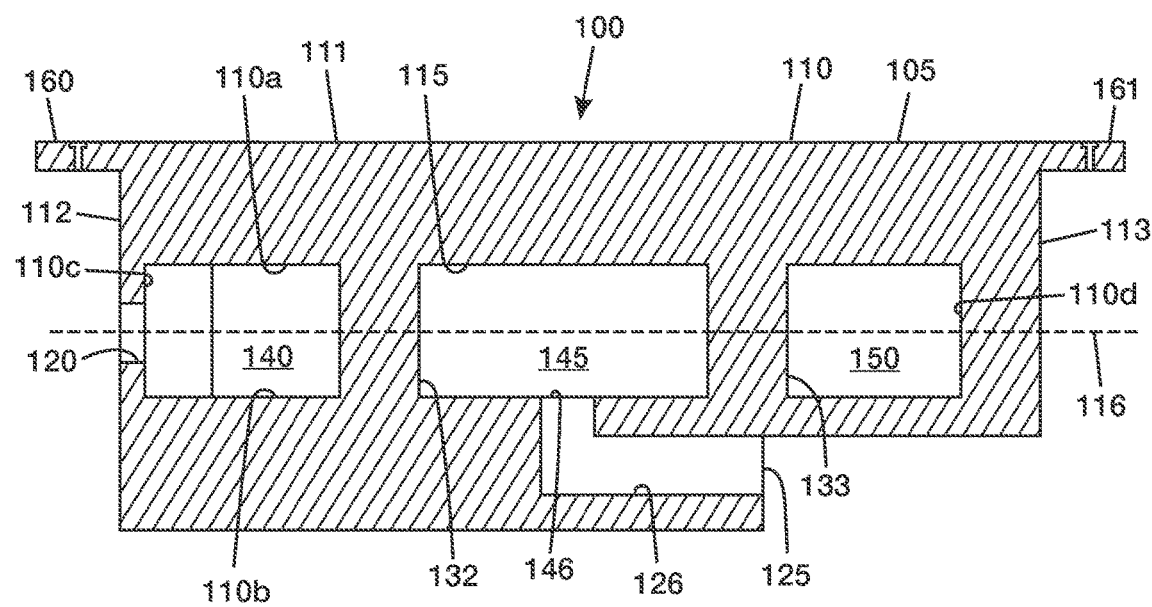
FIG. 4 is a cross-section of the fluidic agitator of FIG. 1 illustrating an alternative placement of an outlet opening.
Figure 5:
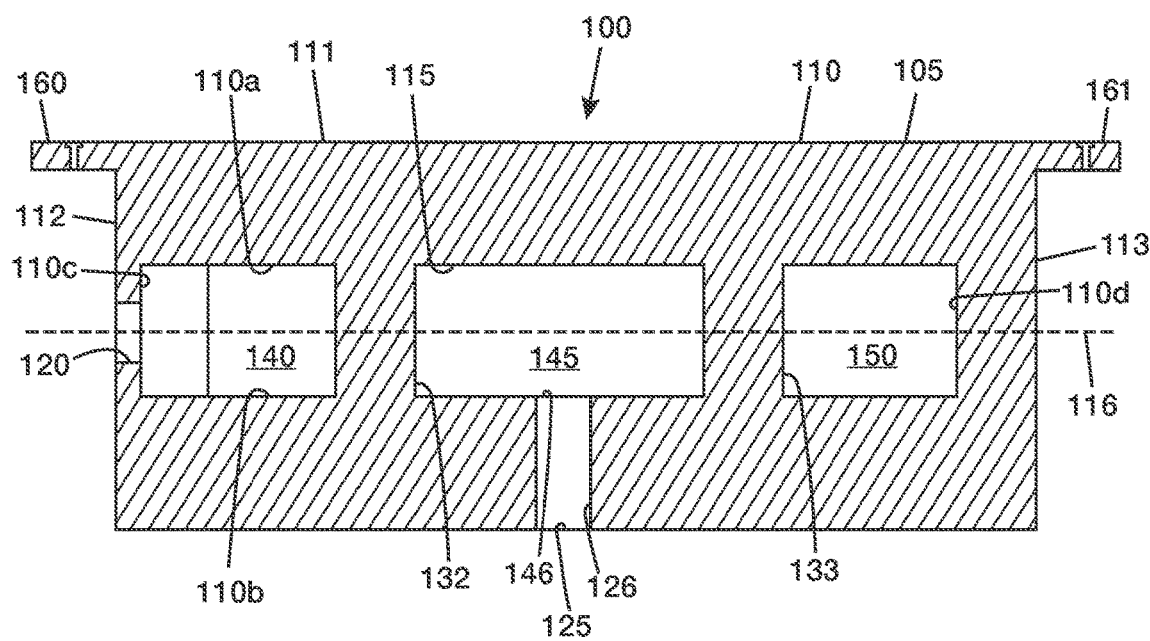
FIG. 5 is a cross-section of the fluidic agitator of FIG. 1 illustrating an alternative placement of an outlet opening.

FIG. 1 shows an exemplary fluidic agitator 100 including a seamless insert body 105 encapsulating a hydraulic pulse generator. The term "seamless insert body" means that the insert body does not have any joints, such as welding joints or adhesive joints. Such seamless body may be made by 3D printing or additive manufacturing. As shown in FIGS. 2 and 3, seamless insert body 105 includes an outer enclosure wall 110 that defines an enclosed cavity 115. The term "enclosed cavity" means that the cavity is surrounded on all sides by the outer enclosure wall. The hydraulic pulse generator is formed within enclosed cavity 115. Outer enclosure wall 110 includes a body wall section 111 extending between opposed end wall sections 112, 113. Body wall section 111 may have a generally cylindrical shape. An inlet opening 120 is formed in end wall section 112 for entry of a fluid stream into enclosed cavity 115. In one example, an outlet opening 125 is formed in end wall section 113 for exit of a fluid stream from enclosed cavity 115. In other examples, as illustrated in FIGS. 4 and 5, outlet opening 125 may be formed in body wall section 111. In FIGS. 2, 4, and 5 outlet opening 125 is shown as fluidly connected to enclosed cavity 115 by an outlet passage 126 formed in body wall section 111.

Referring to FIGS. 2-5, outer enclosure wall 110 has opposed inner surface sections 110a, 110b, opposed inner surface sections 110c, 110d, and opposed inner surface sections 110e, 110f, which together define enclosed cavity 115. In one example, inner surface sections 110a, 110b, 110e, 110f may be flat to provide an enclosed cavity 115 with a square or rectangular cross-sectional shape on a cutting plane transverse to a longitudinal axis 116 of enclosed cavity 115. In another example, inner surface sections 110a, 110b, 110e, 110f may be curved to provide enclosed cavity 115 with a curved cross-section, such as an oval cross-section, on the cutting plane. Seamless insert body 105 includes inner channel walls 130, 131, 132, 133, 134 inside enclosed cavity 115. In one example, inner channel walls 130, 131, 132, 133, 134 are formed as interconnecting webs between inner surface sections 110a, 110b. In one example, inner channel walls 130, 131, 132, 133, 134 are formed integrally with inner surface sections 110a, 110b, i.e., there are no joints or seams between inner surface sections 110a, 110b and inner channel walls 130, 131, 132, 133, 134. In one example, inner channel wall 134 projects from inner surface section 110d and is formed integrally with inner surface section 110d, i.e., there are no joints or seams between inner channel wall 134 and inner surface section 110d. Inner channel walls 130, 131, 132, 133, 134 are arranged to define fluid chambers, channels, and paths of the hydraulic pulse generator within enclosed cavity 115.

In one example, inner channel walls 130, 131 are disposed on opposite sides of longitudinal axis 116. Inner channel walls 130, 131 may be disposed symmetrically about longitudinal axis 116, as shown in FIG. 3. Spacing between inner channel walls 130, 131 provides a fluid channel 135. Inner channel walls 132, 133 are spaced apart along longitudinal axis 116 and positioned within fluid channel 135. An inlet chamber 140 of the hydraulic pulse generator extends from an inlet end of fluid channel 135 to inner channel wall 132. Inlet chamber 140 is in fluid communication with inlet opening 120. A vortex chamber 145 of the hydraulic pulse generator extends between inner channel walls 132, 133. Spacings between inner channel wall 132 and adjacent inner channel walls 130, 131 provide fluid paths 141, 142 between inlet chamber 140 and vortex chamber 145. A feedback chamber 150 of the hydraulic pulse generator extends from inner channel wall 133 to a feedback end of fluid channel 135. Spacings between inner channel wall 133 and adjacent inner channel walls 130, 131 provide fluid paths 151, 152 between feedback chamber 150 and vortex chamber 145. A feedback channel 155 extends from feedback chamber 150, through a spacing between inner channel walls 130, 134, along a spacing between inner channel wall 130 and inner surface section 110e, to an inlet side of fluid channel 135/inlet chamber 140. Another feedback channel 156 extends from feedback chamber 150, through a spacing between inner channel walls 131, 134, along a spacing between inner channel wall 131 and inner surface section 110f, to an inlet side of fluid channel 135/inlet chamber 140.

Figure 6A:
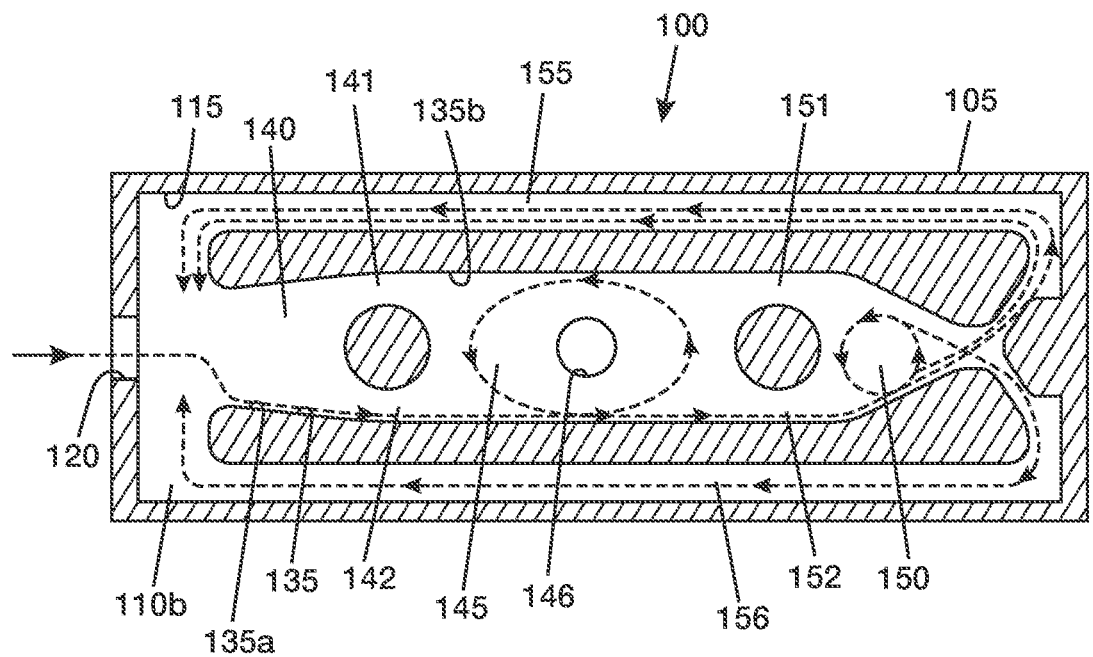
FIGS. 6A, 6B, 6C, and 6D are schematic diagrams showing movement of fluid within the fluidic agitator of FIG. 1 for a full cycle of an oscillation.
Figure 6B:
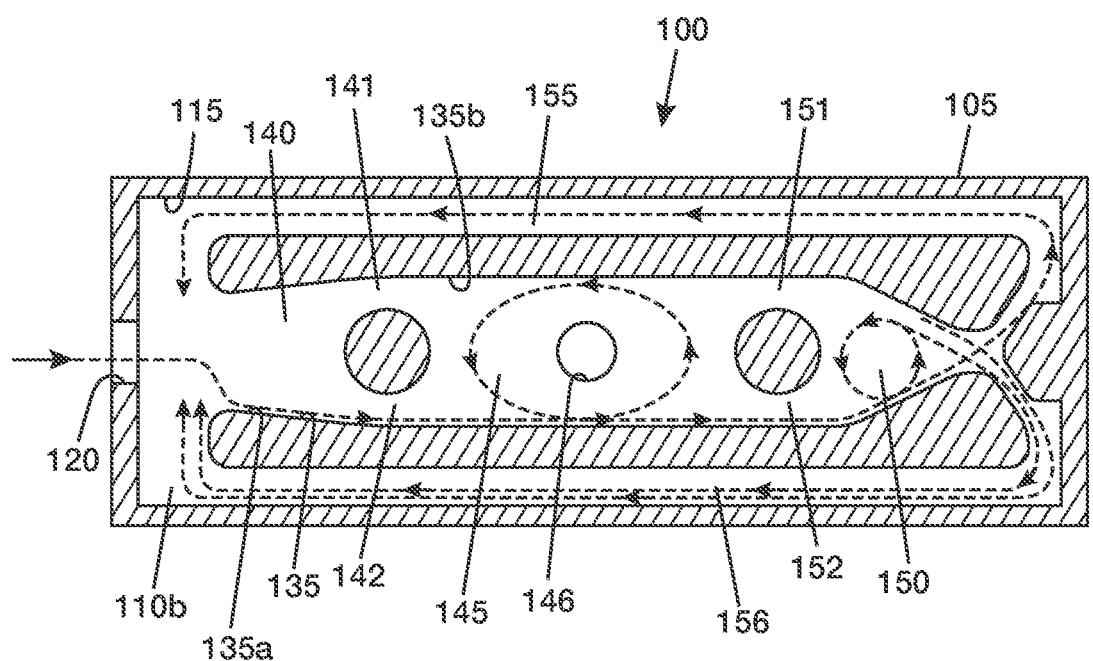
Figure 6C:
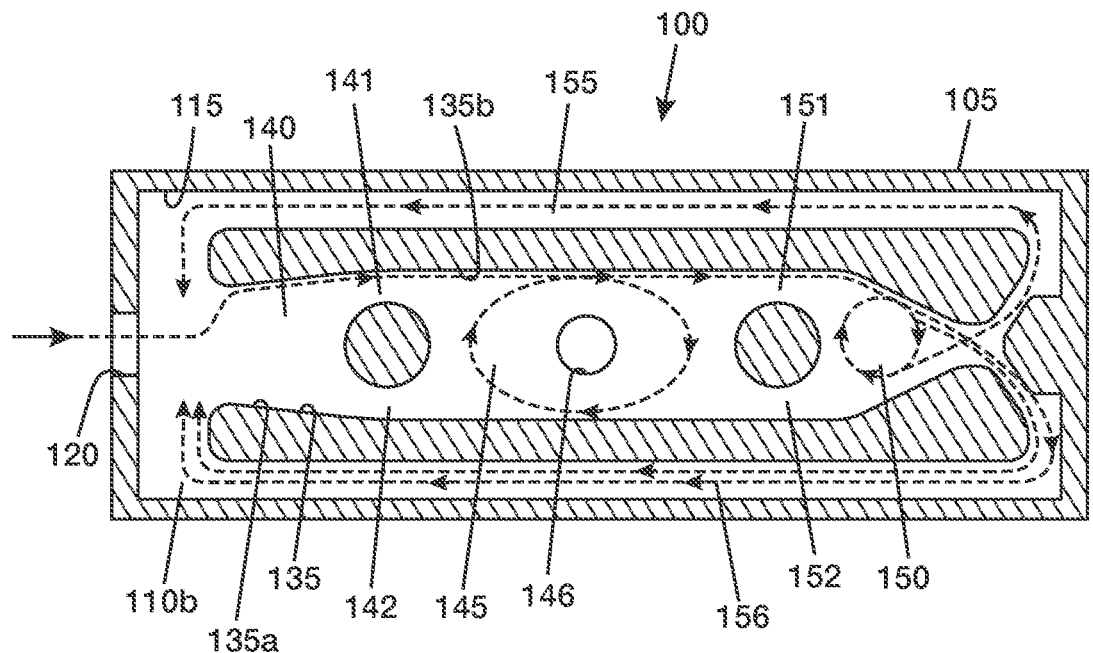
Figure 6D:
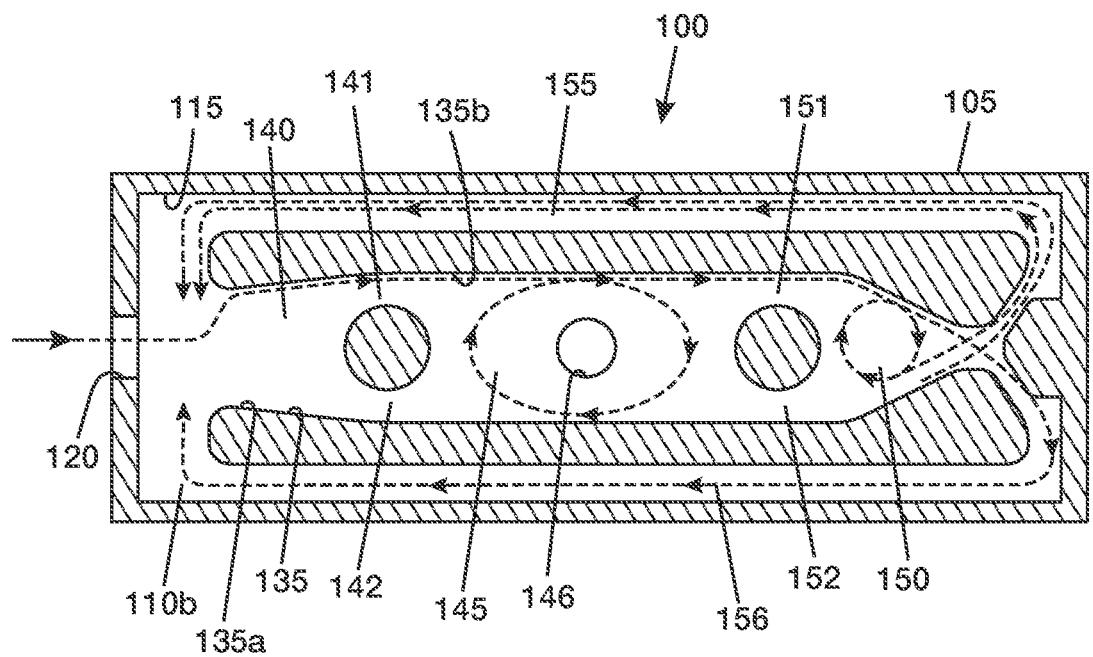

FIGS. 6A-6D show movement of fluid in fluid agitator 100. A mainstream fluid from inlet opening 120 enters inlet chamber 140. The mainstream passes through fluid paths 141, 142 to vortex chamber 145. A portion of the fluid stream may further travel to feedback chamber 150 through fluid paths 151, 152. Sequentially, part of the fluid enters feedback channels 155, 156. The mechanism of fluidic pulse activated agitator is based on a Coanda effect in a Lagrangian coherent structure. At some arbitrary time t1, there is pressure buildup in feedback channel 155 to push the mainstream fluid entering inlet chamber 140 downward so that most of the flow follows the contour of the lower surface 135a of fluid channel 135 due to the Coanda effect, as shown in FIG. 6A (the term "lower" is relative to the orientation of the drawing and refers to the surface of fluid channel 135 that is closest to feedback channel 156). A counterclockwise turbulence is then created in vortex chamber 145. Fluid flow into feedback channel 155 increases. At some time t2, fluid will no longer be able to easily flow into feedback channel 155 due to pressure buildup in feedback channel 155. Instead, more fluid will be pushed into feedback path 156 due to the pressure difference between feedback channels 155, 156, as shown in FIG. 6B. At some t3, when the pressure in feedback channel 156 is higher than the pressure in feedback channel 155, the mainstream fluid entering into inlet chamber 140 from inlet opening 120 will be pushed upward such that most of the flow follows the contour of the upper surface 135b of fluid channel 135 due to Coanda effect, as shown in FIG. 6C (the term "upper" is relative to the orientation of the drawing and refers to the surface of fluid channel 135 that is closest to feedback channel 155). At this moment, the turbulence in vortex chamber 145 switches to the clockwise direction. During this switch, the device creates a pulse of oscillation. Fluid flow into feedback channel 156 increases. At some time t4, fluid will no longer be able to easily flow into feedback channel 156. Instead, more fluid will be pushed into feedback channel 155 due to the pressure difference between feedback channels 155, 156, as shown in FIG. 6D. When the pressure in feedback channel 155 is again higher than the pressure in feedback channel 156, the mainstream fluid entering inlet chamber 140 from inlet opening 120 will be pushed downward such that most of the flow follows the contour of the lower surface 135a of fluid channel 135 due to Coanda effect, as shown in FIG. 6A. This completes a full cycle of the oscillation of the agitator. An orifice 146 is formed in the portion of inner surface section 110b exposed to vortex chamber 145. Orifice 146 is disposed at an end of outlet passage 126 (in FIGS. 2, 4, and 5), which is connected to outlet opening 125 (in FIGS. 2, 4, and 5). Fluid exits vortex chamber 145 through orifice 146.

Returning to FIGS. 1 and 2, body wall section 111 of outer enclosure wall 110 may have outer curved surfaces 111a, 111b. Outer curved surfaces 111a, 111b may have different radii of curvatures as shown in FIG. 1. The radius of curvature of outer curved surface 111a may be selected to be larger than the radius of outer curved surface 111b to provide shoulders 114 on the outer surface of body wall section 111. In one example, fluidic agitator 100 includes flanges 160, 161 projecting from end wall sections 112, 113 of outer enclosure wall 110. Preferably, flanges 160, 161 are integrally formed with seamless insert body 105, i.e., there are no joints between flanges 160, 161 and seamless insert body 105. Such integral forming may be achieved by 3D printing of flanges 160, 161 together with seamless insert body 105. However, because flanges 160, 161 will not be exposed to turbulent flow within enclosed cavity 115, flanges 160, 161 may be formed separately and then attached to seamless insert body 105 in other implementations. Flanges 160, 161 may include holes 162, 163 to accept fasteners. Shoulders 114 and flanges 160, 161 may be used in mounting fluidic agitator 100 in a conduit.

Figure 7:
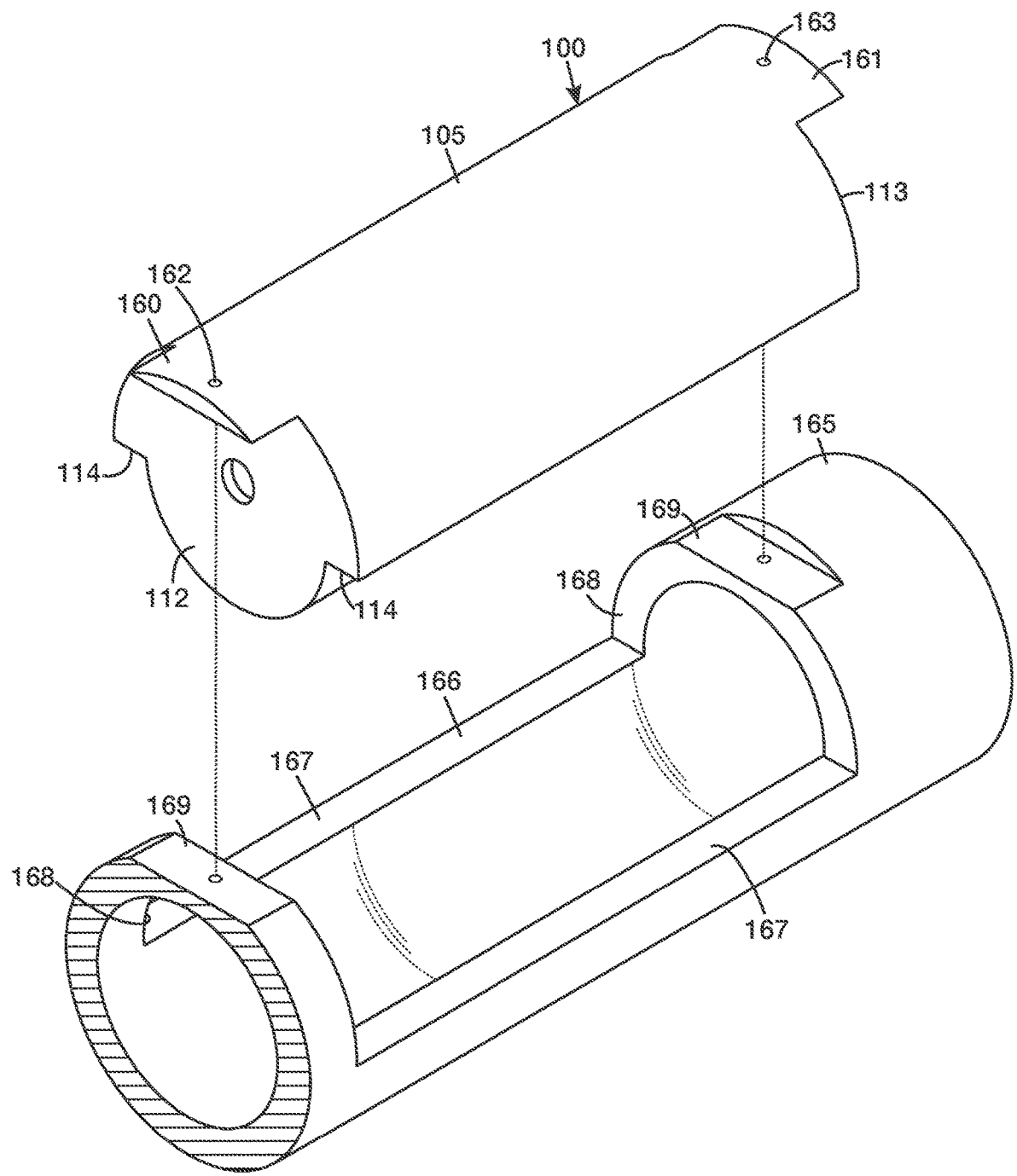
FIG. 7 is a schematic diagram illustrating mounting of a fluidic agitator in a conduit.
Figure 8:
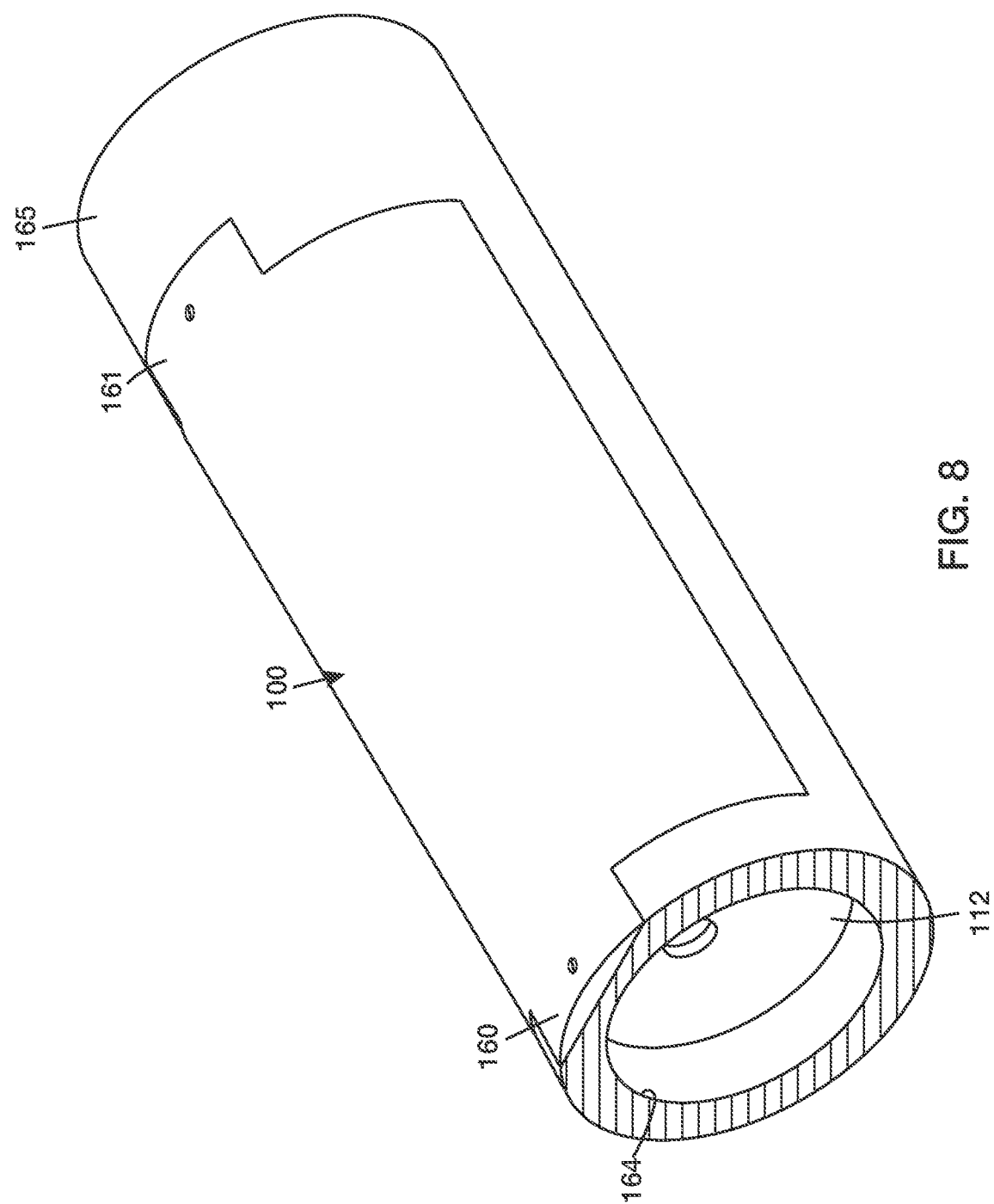
FIG. 8 is a perspective view showing a fluidic agitator mounted in a conduit.
Figure 9A:
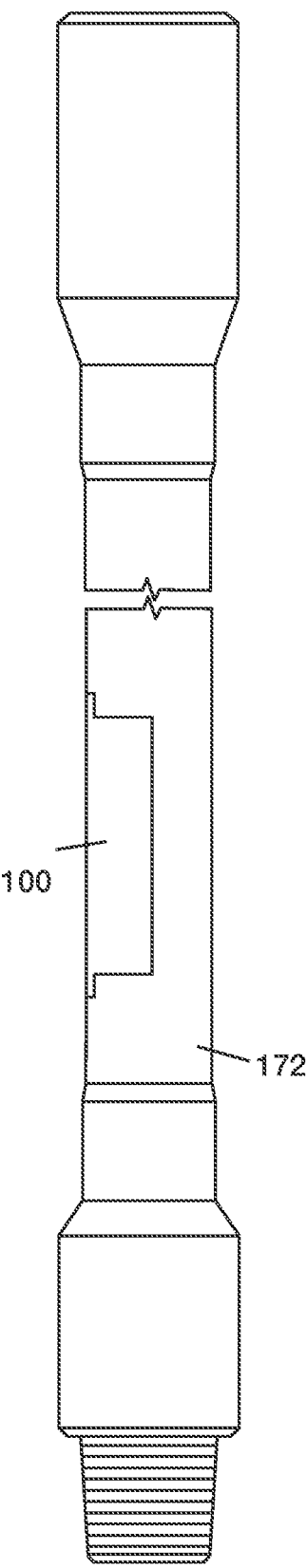
FIG. 9A is a schematic diagram illustrating the fluidic agitator of FIG. 1 installed in a drill pipe.
Figure 9B:
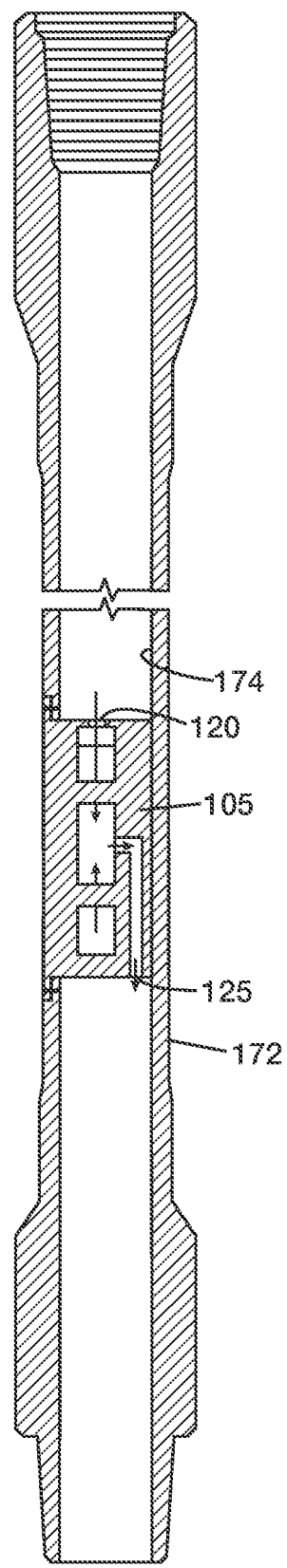
FIG. 9B is a cross-section of the tool of FIG. 9A.

FIG. 7 shows a section of an example conduit 165 including a cutout 166 through which seamless insert body 105 of fluidic agitator 100 may be inserted into the conduit. Conduit 165 may be, for example, a drill pipe or screw-in sub or other pipe. Wall surfaces 167, 168, 169 of conduit 165 are exposed by cutout 166. When seamless insert body 105 is inserted into conduit 165, surfaces 167 of conduit 165 will mate with shoulders 114 of seamless insert body 105, surfaces 168 of conduit 165 will mate with end wall sections 112, 113 of seamless insert body 105, and surfaces 169 of conduit 165 will mate with flanges 160, 161 carried by seamless insert body 105. Surfaces 169 include holes that align with holes 162, 163 in flanges 160, 161. Fasteners, such as screws or bolts, can be inserted into the aligned holes to secure fluidic agitator 100 to the conduit wall. FIG. 8 shows fluidic agitator 100 mounted in conduit 165 and fastened to the conduit wall. The diameter of the portion of seamless insert body 105 within a bore 164 of conduit 165 may be selected to match the diameter of bore 164. FIGS. 9A and 9B show an example of a drill pipe 172 that has been modified to include a cutout to receive fluidic agitator 100. One or more such cutouts can be formed in drill pipe 172 to install one or more fluidic agitators along the pipe. Drill pipe 172 with installed fluidic agitator 100 forms a downhole tool that can be connected in a drill string as any regular drill pipe. In the installed position of fluidic agitator 100, inlet opening 120 and outlet opening 125 on seamless insert body 105 are open to a bore 174 of drill pipe 172.

Figure 10:
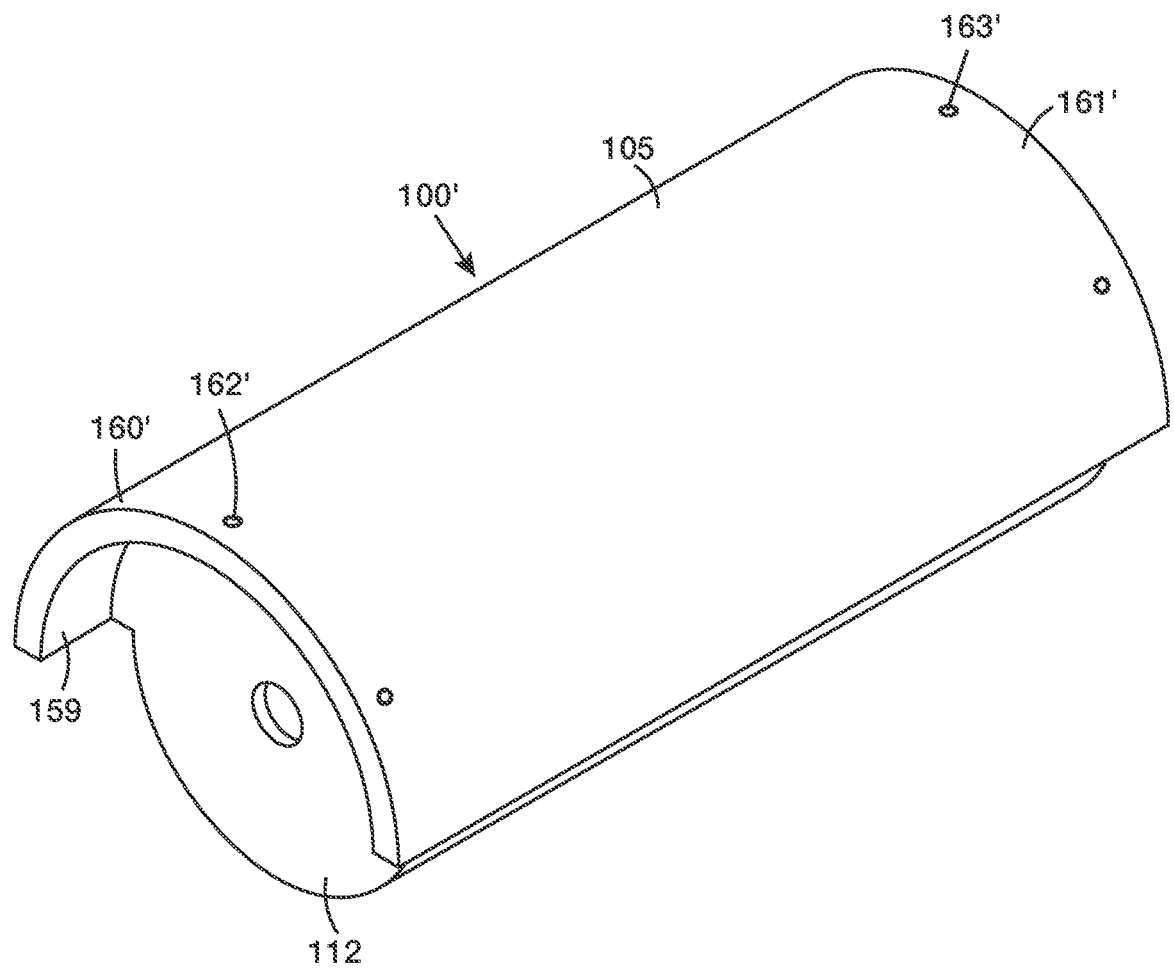
FIG. 10 is a perspective view of a fluidic agitator with curved flanges.

Returning to FIG. 7, surfaces 169 of conduit 165 are shown as flat surfaces to engage complementary flat surfaces on the undersides of flanges 160, 161. However, it is possible for the undersides of the flanges carried by seamless insert body 105 to have curved surfaces and for the conduit wall to have complementary curved surfaces to engage the curved surfaces of the flanges. FIG. 10 shows a variation 100' of the fluidic agitator with flanges 160', 161' having curved surfaces 159 on the undersides for mating with similarly curved conduit wall surfaces. Flanges 160', 161' may have circumferentially spaced-apart holes 162', 163' to receive fasteners. The fluid agitator variation shown in FIG. 10 differs from the one shown in FIGS. 1-9 only in the shape of the mounting flanges carried by the seamless insert body.

Figure 11:
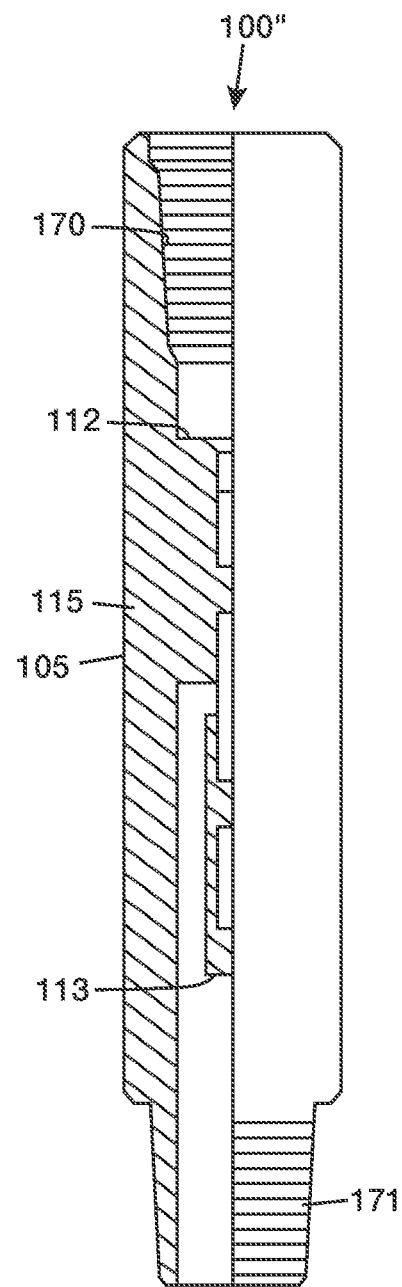
FIG. 11 is a perspective view of a fluidic agitator with threaded connections.

FIG. 11 shows a variation 100" of the fluidic agitator where threaded sections 170, 171 replace mounting shoulders and flanges. Threaded section 170 is disposed adjacent to end wall section 112 of seamless insert body 105. Threaded section 171 is disposed adjacent to end wall section 113 of seamless insert body 105. Threaded section 170 is shown as a box connection, i.e., with internal threads, and threaded section 171 is shown as a pin connection, i.e., with external threads. However, it is possible for threaded section 170 to be a pin connection and for threaded section 171 to be a box connection. Threaded sections 170, 171 may be integrally formed with end wall sections 112, 113, i.e., without joints or seams between threaded sections 170, 171 and seamless insert body 105. However, in other implementations, threaded sections 170, 171 may be attached to seamless insert body 105 with joints or seams. Fluidic device 100" can be connected to a conduit, such as a drill pipe, by simply making up a threaded connection. The fluid agitator variation shown in FIG. 11 can have the same hydraulic pulse generator as described for the fluid agitator shown in FIGS. 1-9.

Figure 12:
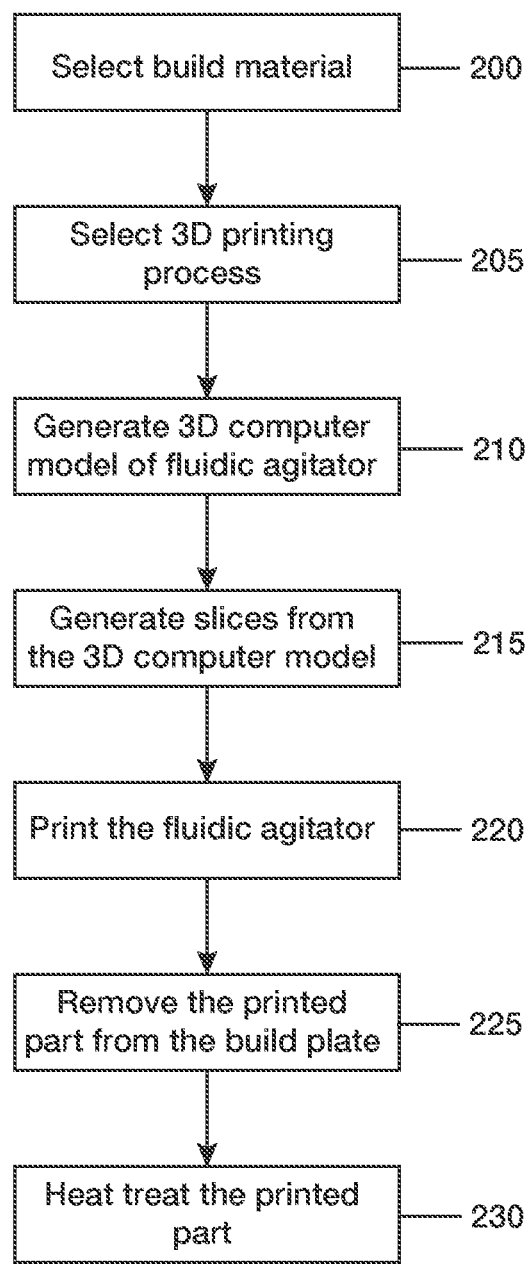
FIG. 12 is a flowchart illustrating an additive manufacturing process for a fluidic agitator.

In one implementation, fluidic agitator 100 (and variations thereof) is made by additive manufacturing. FIG. 12 illustrates the general process. At 200, a material to use in making the seamless insert body is selected. The choice of material will depend on the use environment of the fluidic agitator as well as the available 3D printers that can be used in the additive manufacturing process. In one example, fluidic agitator 100 is intended for use downhole in a wellbore. In this case, the material selected at 200 can be one that can withstand the downhole environment. In one example, the material may be selected from metals, metal alloys, ceramics, and composites. In a more particular example, the material may be selected from steels, titanium-based alloys, aluminum-based alloys, nickel-based alloys, ceramics, and composites. Specific examples of materials that may be used include, but are not limited to, 174 PH steel, Inconel 718, Inconel 625, high strength aluminum-based alloys, 4340 steel, and carbide with metal binder. In the specific example of the carbide with metal binder, the carbide can be tungsten carbide, and the metal binder can be a metallic alloy, such as, but not limited to, a nickel-based alloy, a cobalt-based alloy, and an iron-based alloy. More specifically, the tungsten carbide may comprise sintered tungsten carbide cobalt (WC—Co) alloy, sintered tungsten carbide nickel (WC—Ni) alloy, sintered tungsten carbide cobalt nickel (WC—Co—Ni) alloy, cast or macroline tungsten carbide (WC/$W_2$C), monocrystalline tungsten carbide (WC), and/or mixtures thereof. Depending on the 3D printing process, the selected material may be provided in powder form or wire form. If the material is provided in powder form, the particle sizes may range from 15 microns to 60 microns in one example.

At 205, the 3D printing process to use in the additive manufacturing of the agitator is selected. The selected 3D printing process will depend in part on the material selected at 200 and in part on the capability of the 3D printing process to print a part with a complex internal structure. In one example, the 3D printing process may be selected from direct laser melting (DLM) of powder or wire, direct electron beam melting (EBM) of powder or wire, selective laser sintering (SLS) of powder or direct metal laser sintering (DMLS), and binder jetting. Some of these printing processes, such as those involving melting of material, may require support structures when printing the chambers, channels, and fluid path areas within the seamless insert body. These support structures will have to be removed after printing and may add complexity and cost to the additive manufacturing process as well as negatively impact the smoothness of the surfaces within the chambers, channels, and fluid paths. The processes involving sintering of powder may require fewer to no support structures as the surrounding powder may be able to act as support structures. Binder jetting does not require support structures.

At 210, a 3D computer model of the fluidic device 100 is generated using computer-aided design (CAD) software for mechanical objects. Examples of Industrial grade CAD software that may be used include, but are not limited to AutoCAD, Pro/ENGINEER CATIA, Fusion 360, Autodesk Inventor, Solidworks, and Siemens NX. The 3D computer model can be designed to take into account any expected dimensional changes as a result of post-processing of the printed part and minimum wall thicknesses to minimize warping and distortion in the printed part. The CAD software outputs digital data of the 3D model, typically in a stereolithography (STL) format. At 215, the 3D model is read into a slicing software, or slicer. Examples of slicers include Cura and Netfabb Standard. The slicer slices the 3D model into layers or slices. Each layer contains a portion of the geometry of the object represented by the 3D model. For each layer, the slicer generates the path for a 3D printer to follow to print the layer. Printing parameters such as layer height, speed of printing, and support structure settings may be provided to the slicer to aid in generating the printing instructions for each layer. The slicer outputs a build model containing the layer by layer printing instructions. The output of the slicer may be in a computer numerical control (CNC) language, such as G-code.

Figure 13:
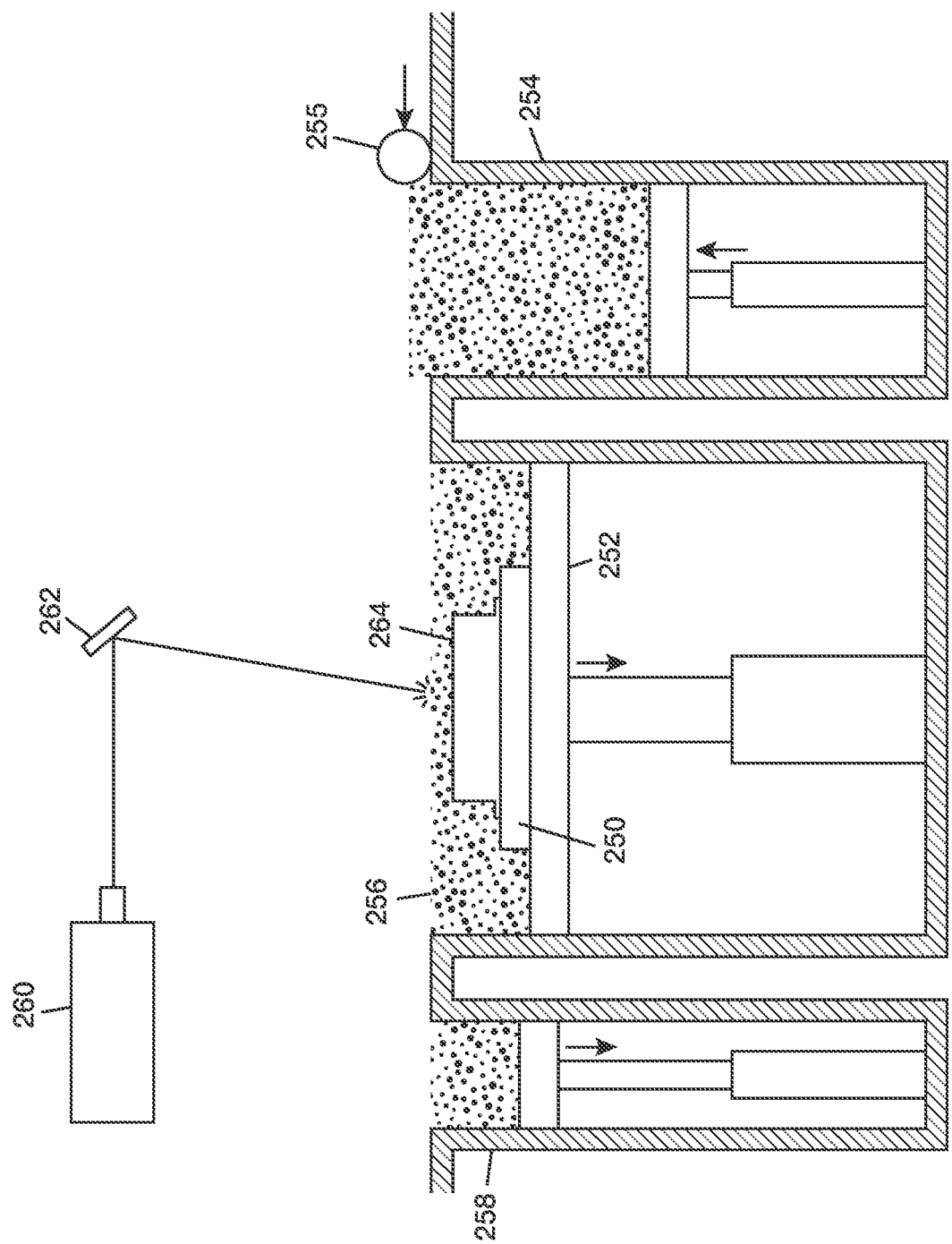
FIG. 13 is a schematic diagram of a setup for 3D printing with an energy source.

At 220, the build model and material are provided to the 3D printer. In one illustrative example, the 3D printing process selected at 205 is selective laser beam melting of powder, and the material selected at 200 is 17-4 PH stainless steel. The stainless steel material is provided in powder form. The nominal size of the powder may be about 10 to 15 microns, with 80% of the particle sizes below 22 microns. FIG. 13 shows an example setup of the 3D printer, including a build plate 250 on a movable platform 252, a powder bin 254 containing powder of the material selected at 200 (in FIG. 12), a roller or blade 255 to spread a layer of powder over powder bed 256, an overflow bin 258 to take excess powder from powder bed 256, a laser 260 to provide a laser beam, and a scanning system 262, e.g., a system of scanning mirrors, to scan the laser beam over powder bed 256 according to the layer being printed. The entire system may be contained within a chamber having a controlled atmosphere of inert gas. To print the part, a control system controls roller 255 to spread a layer of powder from powder bin 254 over powder bed 256. Then, the control system controls scanning system 262 to scan the laser beam from laser 260 over the powder bed. The laser beam will selectively melt the particles in the powder bed to form solid metal. After printing of the layer is completed, the control system lowers platform 252. Then, the process of spreading a layer of powder over powder bed 256 and scanning the laser beam over the powder bed is repeated. The part is built layer by layer. If support structures are needed, this can also be built in the layer. FIG. 13 shows a part 264 that is being built. 3D printing by electron beam melting works similarly to 3D printing by laser beam melting, except that the energy source in the case of electron beam melting is an electron beam and the printing takes place in a vacuum atmosphere.

Returning to FIG. 12, after 3D printing of the part is complete, the part is separated from the build plate, as indicated at 225. This removal may require use of machining tools such as a bandsaw or wire electric discharge machining. Prior to separating the part from the build plate, powder that was not melted during the 3D printing (in the case of powder-based printing) may be removed from the part by blowing or brushing. Removal of the part from the build plate may result in rough surfaces on portion of the part that was previously in contact with the build plate. This surface can be machined using traditional machining processes. In some cases, a "waste layer" may be built into the 3D computer model. This waste layer may be the portion of the part that makes contact with the build plate and that is subsequently sectioned off when separating the part from the build plate. If support structures were formed in the chambers, channels, and fluid path areas of the part during the 3D printing, these support structures will also need to be removed. Removal of support structures may result in rough surfaces inside the chambers, channels, and fluid paths. These rough surfaces may need to be removed by machining or chemical processes such as etching. At 230, the part may be subjected to a heat treatment to release stresses within the part. For example, a part made with 17-4 PH stainless steel may be solution heat treated at 1040° C. for 30 minutes, followed by cooling to room temperature. The part can be further annealed at 482° C. in Argon for 1 hour, followed by cooling to room temperature. With this heat treatment, a tensile yield strength of about 920 MPa may be achieved.

Figure 14:
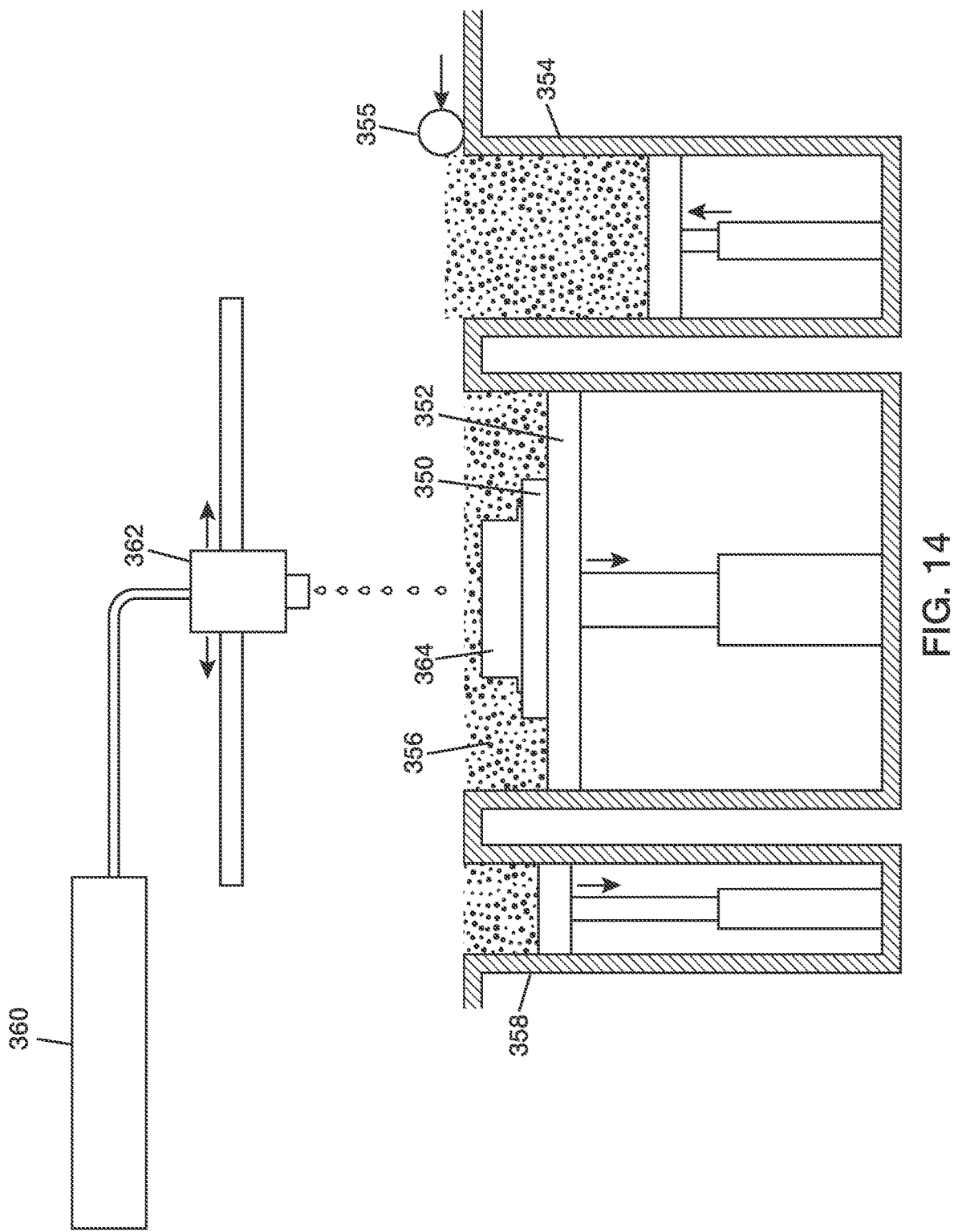
FIG. 14 is a schematic diagram of a setup for 3D printing by binder jetting.

An alternative to using melting processes to print the part is 3D printing by binder jetting, which may have the advantage of not requiring support structures. FIG. 14 shows an example setup of the 3D printer, including a build plate 350 on a movable platform 352, a powder bin 354 containing powder of the material selected at 200 (in FIG. 12), a roller or blade 355 to spread a layer of powder over powder bed 356, an overflow bin 358 to take excess powder from powder bed 356, a source 360 of liquid binding agent, and an inkjet printhead 362. Liquid binding agent may be, for example, a thermosetting polymer. Inkjet printhead 362 receives liquid binding agent from source 360. To print a part, a control system controls roller 355 to spread a layer of powder from powder bin 354 over powder bed 356. Then, the control system controls inkjet printhead 362 to selectively dispense the liquid binding agent into powder bed 356, thereby selectively binding the particles in the powder bed together. The control system controls inkjet printhead 362 to dispense the liquid binding agent according to the printing instructions (215, 220 in FIG. 12) for the layer. After printing of the layer is completed, the control system lowers platform 352. Then, the process of spreading a layer of powder over powder bed 356 and dispensing liquid binding agent is repeated. The part is built layer by layer until completed. FIG. 14 shows a part 364 that is being built. Instead of acts 225 and 230 in FIG. 12, the 3D part produced by binder jetting is cured to increase the strength of the part so that the part can be safely removed from the powder bed and so that any loose particles can be removed from the part. The part is then sintered. During sintering, the binding agent will be burnt off, and the particles will fuse together. Infiltration may be used to increase the density of the part.

In both the printing by laser beam melting and binder jetting or other suitable 3D printing process, the final part (fluidic agitator or insert) is a single-piece product that does not have seams. It is expected that such a seamless product will have improved erosion resistance in the presence of turbulent flow. In some cases, the erosion resistance can be further improved by applying a hard coating to the surfaces of the part that will be exposed to turbulent flow during generation of hydraulic pulses, i.e., the inner surfaces 110*a*-110*f* in FIGS. 2-5.

The detailed description along with the summary and abstract are not intended to be exhaustive or to limit the embodiments to the precise forms described. Although specific embodiments, implementations, and examples are described herein for illustrative purposes, various equivalent modifications can be made without departing from the spirit and scope of the disclosure, as will be recognized by those skilled in the relevant art.

The invention claimed is:

1. A fluidic agitator comprising:
a seamless insert body having an outer enclosure wall comprising an inlet opening, an outlet opening, and a body wall section extending between a first end wall section and a second end wall section,
wherein the outer enclosure defines an enclosed cavity and a plurality of inner channel walls that are arranged to define an inlet chamber fluidly connected to the inlet opening, a vortex chamber fluidly connected to the outlet opening, and a feedback chamber within the enclosed cavity,
wherein the inlet chamber, the vortex chamber, and the feedback chamber are configured to create a hydraulic pulse in a fluid stream received in the enclosed cavity;
a first flange projecting from the first end wall section of the seamless insert body; and
a second flange projecting from the second end wall section of the seamless insert body.

2. The fluidic agitator of claim 1, wherein the plurality of inner channel walls are arranged to define a first fluid path and a second fluid path between the inlet chamber and the vortex chamber.

3. The fluidic agitator of claim 2, wherein the plurality of inner channel walls are arranged to define a third fluid path and a fourth fluid path between the feedback chamber and the vortex chamber.

4. The fluidic agitator of claim 3, wherein the plurality of inner channel walls are arranged to define a first feedback channel and a second feedback channel extending between the inlet chamber and the feedback chamber and along an inner surface of the outer enclosure wall.

5. The fluidic agitator of claim 4, further comprising an outlet passage formed in the outer enclosure wall, the outlet passage fluidly connected to the vortex chamber and the outlet opening.

6. The fluidic agitator of claim 1, wherein the inlet opening is formed in the first end wall section, and wherein the outlet opening is formed in one of the body wall section and the second end wall section.

7. The fluidic agitator of claim 1, further comprising a first threaded connection coupled to the first end wall section and a second threaded connection coupled to the second end wall section.

8. The fluidic agitator of claim 1, wherein an exterior surface of the body wall section comprises a first curved surface and a second curved surface, and wherein a radius of curvature of the first curved surface is different from a radius of curvature of the second curved surface.

9. The fluidic agitator of claim 8, wherein the exterior surface of the body wall section further comprises a shoulder formed between the first curved surface and the second curved surface.

10. The fluidic agitator of claim 1, wherein the seamless insert body comprises a metal, a metal alloy, a ceramic, or a composite material.

11. A downhole tool comprising:
a pipe having a cutout formed in a wall thereof; and
a fluidic agitator comprising:
a seamless insert body inserted in the pipe through the cutout, the seamless insert body having an outer enclosure wall defining an enclosed cavity and a plurality of inner channel walls that are arranged to define an inlet chamber, a vortex chamber, and a feedback chamber within the enclosed cavity,
wherein the inlet chamber, the vortex chamber, and the feedback chamber are configured to create a hydraulic pulse in a fluid stream passing through the pipe and
at least one flange that mates with a portion of the wall exposed by the cutout.

12. The downhole tool of claim 11, wherein an exterior surface of the seamless insert body comprises at least one shoulder that mates with a portion of the wall exposed by the cutout.

13. The downhole tool of claim 11, wherein the outer enclosure wall includes an inlet opening that is fluidly connected to the inlet chamber and an outlet opening that is fluidly connected to the vortex chamber, and wherein the inlet opening and outlet opening are open to a bore of the pipe.

\* \* \* \* \*